UNITED STATES PATENT OFFICE.

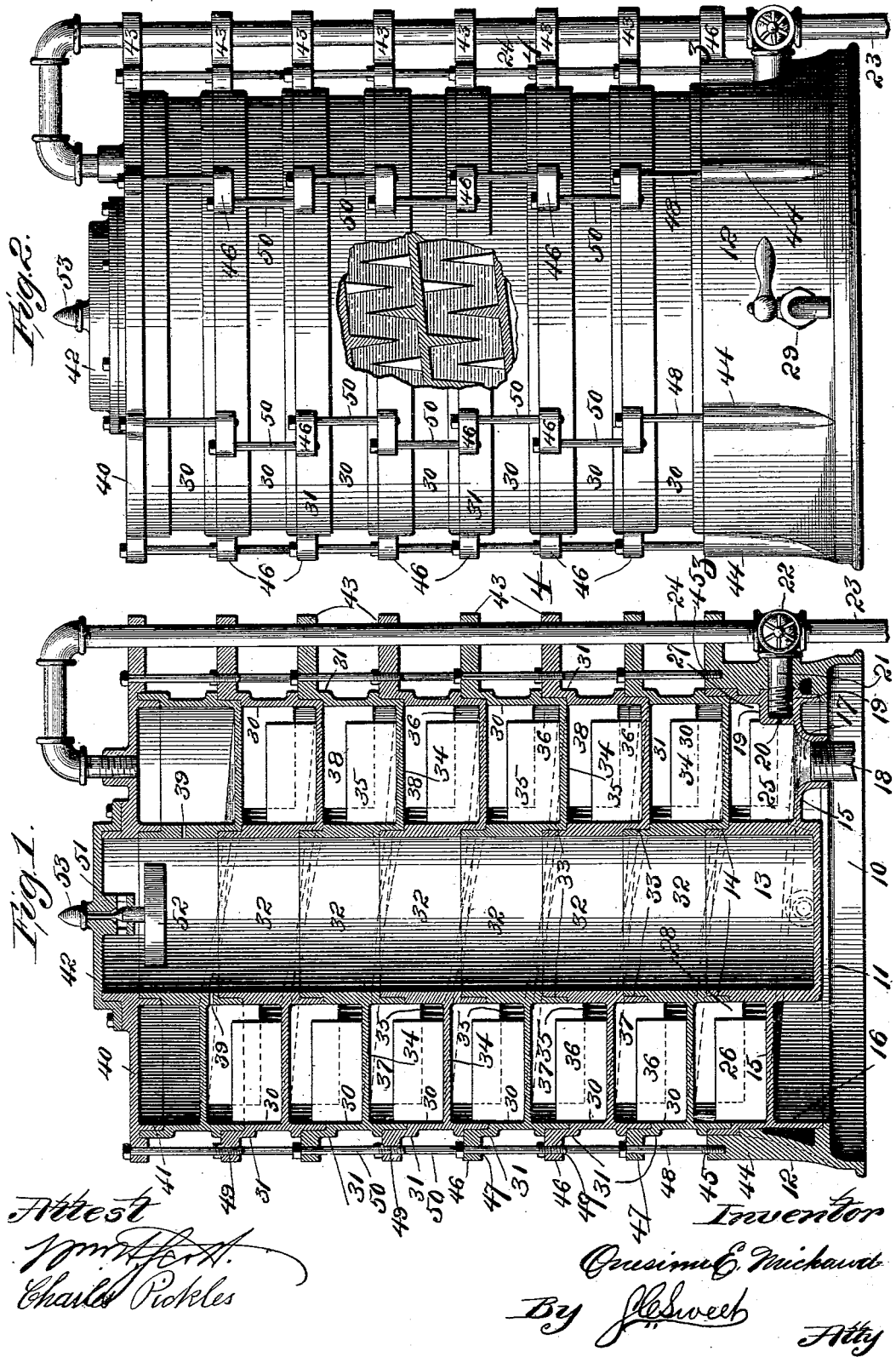

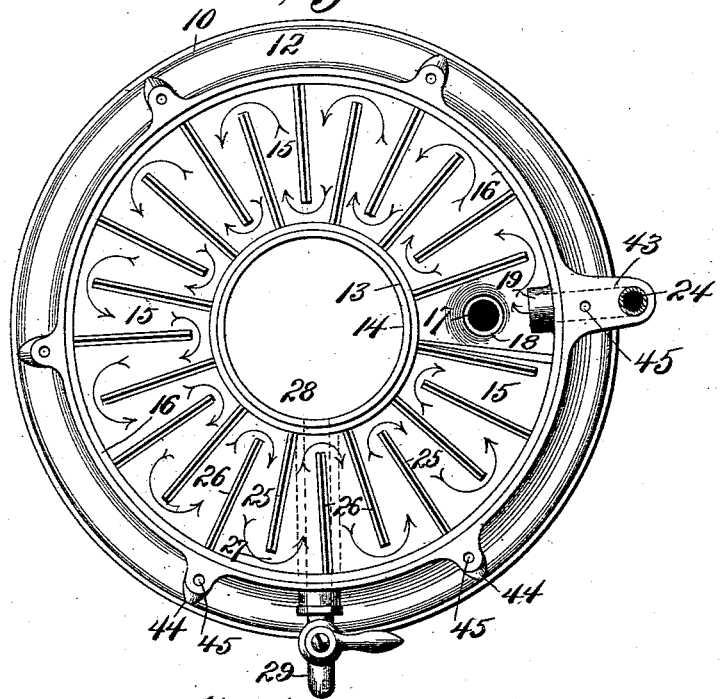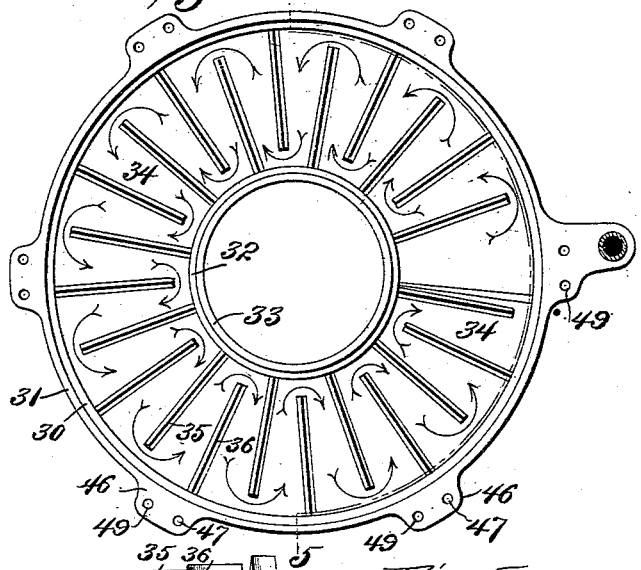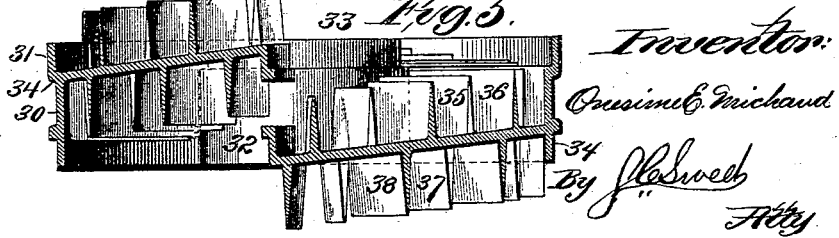

ONESIME E. MICHAUD, OF ST. LOUIS, MISSOURI.

MEANS FOR CLARIFYING LIQUID.

SPECIFICATION forming part of Letters Patent No. 555,388, dated February 25, 1896.

Application filed January 3, 1895. Serial No. 533,707. (No model.)

*To all whom it may concern:*

Be it known that I, ONESIME E. MICHAUD, a citizen of the United States, residing at St. Louis, in the State of Missouri, have invented certain new and useful Improvements in Means for Clarifying Liquid; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to precipitate the sediment and foreign substances in water or other liquid intended for domestic use.

This invention consists in a receptacle containing a tank for purified or clarified water, and having means of ingress for said water, in which receptacle a spiral obstructed devious water-way is formed, along which water-way the fluid must travel slowly for a long distance, constantly and abruptly changing its line of travel and tending to precipitate foreign substances carried therein along said water-way, the fluid being introduced to said water-way at the lowest level thereof and through an opening of less area than the transverse area of said water-way and caused to travel to a greatly higher plane to the port of communication between said water-way and the tank under pressure.

This invention consists further in the construction, arrangement, and combination of parts hereinafter set forth, pointed out in my claims, and shown in the drawings, in which—

Figure 1 is a sectional elevation of the complete device on the indicated line 1 1 of Fig. 3. Fig. 2 is an elevation of the device, a portion of the casing being broken away to show interior construction. Fig. 3 is a plan view of the base portion on the indicated line 3 3 of Fig. 2. Fig. 4 is a plan view of one of the upper sections on the indicated line 4 4 of Fig. 2. Fig. 5 is a sectional elevation of one of the upper sections on the indicated line 5 5 of Fig. 4.

In the construction shown the numeral 10 designates a supporting-base, preferably formed of cast metal, and comprising the bottom 11 and peripheral rim 12 extending above and below said bottom and integral therewith.

Located within the upwardly-projecting portion of the rim 12 and resting on the bottom 11 is the base-section of the superstructure, which base-section comprises a central circular tube 13 having a reduced neck 14, and an inclined or helical bottom 15 surrounding said tube and surrounded by a rim 16 fitting within the rim 12, but of less height than said rim 12, the tube 13, bottom 15, and rim 16 being preferably made of metal cast in one piece.

Adjacent to the point of contact between the bottom 11 and inclined bottom 15 a port 17 is formed in said bottoms, in which port is seated a drain-pipe 18 normally to be closed.

A supply-tube 19 is integrally formed on the bottom 15 adjacent to the drain-pipe 18, the inner end of which supply-tube is closed except for a single aperture 20 of materially less area than the space between the rim 16 and tube 13, which space is the nominal transverse area of the water-way.

An aperture is formed in the rim 12 adjacent to the tube 19 and registering therewith, in which aperture is mounted a pipe 21 communicating with the tube 19 and having connected thereto a common three-way valve 22, which valve is also connected with a service-pipe 23 and flush-pipe 24, the valve-plug being seated in a common manner to control the flow of water from the service-pipe and either cut off or direct the flow of water to the supply-tube 19 or flush-pipe 24.

A series of deflectors 25 26 are integrally formed on the inclined bottom 15, which deflectors alternately, respectively, integrally attach to the tube 13 and the rim 16, spaces 27 28 being provided between the free ends of said deflectors and the rim and tube, respectively, as indicated further by semicircular arrows in Fig. 3. The deflectors 25 26 are of uniform dimensions, and seated on the inclined bottom 15 present a graduated series of upper margins and a staggered radial arrangement between the tube 13 and rim 16.

A service-faucet 29 is mounted in the base portion and affords egress from the tube 13.

A series of upper sections, in this instance seven in number, are provided, which sections are alike, and each comprises a rim 30, having an enlarged collar 31 integral on its upper margin, a central circular tube 32, having a reduced neck 33, a helical or inclined bottom 34 integral with the rim 30 and tube 32, deflectors 35 36 on the top of the bottom 34 arranged in like manner to the deflectors 25 26, and deflectors 37 38 on the lower surface of the bottom 34 arranged in like manner to the remaining deflectors and alternating with those contiguous to and next below in the completed construction.

The helical or inclined bottoms 34 15 conjunctively form a continuous roof and floor for a helical or spiral water-way, the sides of which water-way are formed by the conjoined tubes 13 32 and rims 16 30, and the flow of fluid through the said water-way is constantly obstructed and deviated by the conjunctive operations of the deflectors 25 26, 35 36, and 38 37, the mean space between the contiguous deflectors, combined with the mean space between the ends of said deflectors and the adjacent tube or rim, determining the actual transverse area of the water-way, which area of the water-way, it will be observed, is much greater than the area of the supply-aperture 20.

The tubes 13 32 are fitted together by the lower margin of the next higher tube, and conjunctively form an annular tank into which the clarified or purified liquid overflows from the water-way through ports 39 in the upper one of said tubes, which ports 39 designate approximately the maximum altitude of the liquid in the water-way.

A cover for the device is provided, which comprises a plate 40, having a marginal flange 41 fitted to the upper margin of the upper rim 30, and a cap-plate 42, fitted over a central circular aperture in the plate 41, which aperture coincides with the tubes 32, the upper margin of the upper tube, 32, being fitted to the plate 40 adjacent to said aperture.

A plurality of lugs 43, having vertically-aligning apertures, are formed on and extend outwardly from the rims 12 30, through which apertures the flush-pipe 24 extends to a plane above the cover of the device. An ingress-port is formed in the top plate, 40, which port is connected to the upper end of the flush-pipe 24 and affords communication between the said flush-pipe and the upper portion of the water-way.

A plurality of lugs 44 or webs are formed on the periphery of the rim 12, in which lugs are formed vertical screw-seats 45.

A plurality of lugs 46 are formed on the periphery of each of the rims 30 and plate 40, which lugs are arranged in aligning columns registering with the webs or lugs 44, the lower series of lugs 46 each having an aperture 47, through which lug-screw 48 is passed and seated in the lug 44 immediately below the same. Each series of lugs 43 46, except those on the plate 40, have a screw-threaded aperture 49, in which is seated a lug-screw 50, which is passed through a registering aperture in the lug 44 50 just above and in the column therewith. The lug-screws occupy staggering vertical planes, Fig. 2, and with the lug-screws 48 bind the several sections of the device together.

A vent is formed in the center of the cap-plate 42, in which vent is mounted a needle-valve 51, having a float 52 on its lower end and a nut or cap 53 on its upper end.

In practical operation to clarify liquid the valve 22 is arranged to afford communication from the service-pipe 23 through the port 20, and the liquid forced through said port along the water-way and through the ports 39 into the tank formed by the tubes 13 32, said liquid in its slow and devious passage along the water-way depositing the suspended sediment on the bottoms, deflectors, tubes and rims engaged thereby, the clarified water being withdrawn from the tank through the faucet 29 when desired for use. During the filling of the tank the air displaced by the entering water escapes through the vent in the cap-plates 42, and when said tank is full the float is raised by the liquid, elevates the needle-valve and closes said vent.

When it is desired to cleanse the device by removing the sediment therefrom, the valve 22 is arranged to cut off the port 20 and establish communication with the flush-pipe, the drain-pipe 18 is open, and water forcibly introduced to the upper portion of the water-way, which water traveling downwardly along said water-way thoroughly cleanses the same.

What I claim is—

1. A liquid-clarifying apparatus comprising a casing, a helical way for the liquid within said casing, an annular reservoir concentrically located in said helical way, means of liquid-ingress at the bottom of said helical way, means of liquid-egress at the top of said helical way, and deflectors in said helical way, as set forth.

2. A liquid-clarifying apparatus comprising a sectional casing, a helical way for liquid within said casing, deflectors in said helical way, a port of ingress at the bottom of said helical way of less area than the transverse area of said helical way, a port of egress at the top of said helical way, and a tank inclosed by said helical way and communicating with the said egress-ports.

3. A liquid-clarifying apparatus comprising a casing, a helical way in said casing, a tank inclosed by said way, and communicating with the top thereof, means of egress from said tank, an ingress-port at the bottom of said way, a cut-off valve, a flush-pipe entering the top of said way, and a drain-pipe leading from the bottom of said way.

4. A liquid-clarifying apparatus comprising a casing formed in sections, inclined bottoms in said sections, deflectors mounted on opposite sides of the said bottoms, the deflectors on the one side alternating with the deflectors on the other side, a reservoir centrally located in the device and composed of joining sectional tubes fixed to said bottoms and communicating therethrough, means for connecting said sections, and ports of liquid ingress and egress to and from said sections and reservoir, as set forth.

5. In a liquid-clarifying apparatus the combination of a casing formed in sections and provided with inclined bottoms forming a helical way, a reservoir centrally located in said casing and inclosed by said helical way, a port of ingress to the lower end of said helical way and communicating with a service-main, a port of egress from the upper end of the helical way to the reservoir, a float-valve in the reservoir, and a faucet communicating with the lower end of said reservoir, as set forth.

6. A liquid-clarifying apparatus, comprising a casing, a helical way for the liquid in said casing, means of liquid-ingress at the bottom of said helical way, means of liquid-egress at the top of said helical way, and deflectors located in said helical way an inclined or helical bottom, forming the helical way, to the opposite sides of which said deflectors are fixed for projection into said helical way, one set of said deflectors alternating with the other set and overlapping the same vertically and radially, as set forth.

In testimony whereof I affix my signature in presence of two witnesses.

ONESIME E. MICHAUD.

Witnesses:
S. C. SWEET,
CHARLES PICKLES.